Nov. 11, 1941.    R. A. LAKE    2,262,012
TELEGRAPH TRANSMITTER
Filed July 18, 1938    5 Sheets-Sheet 1
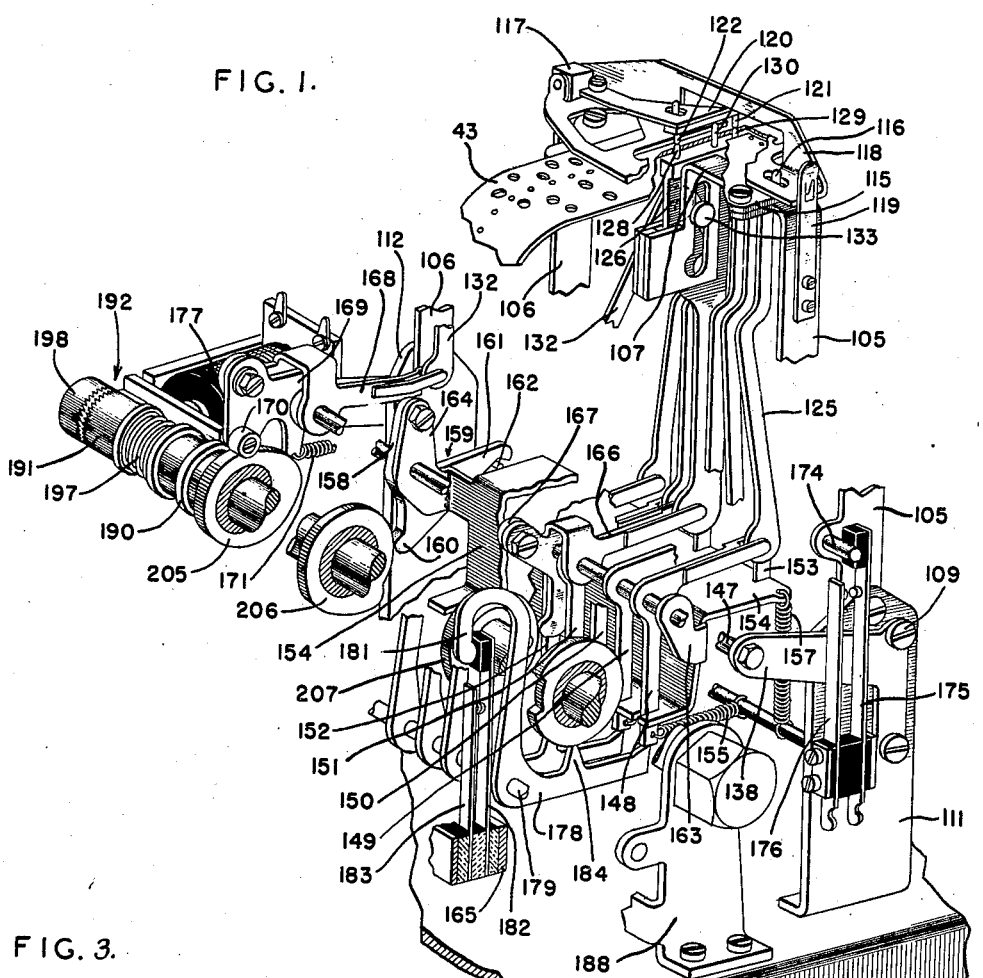
FIG. 1.
FIG. 3.
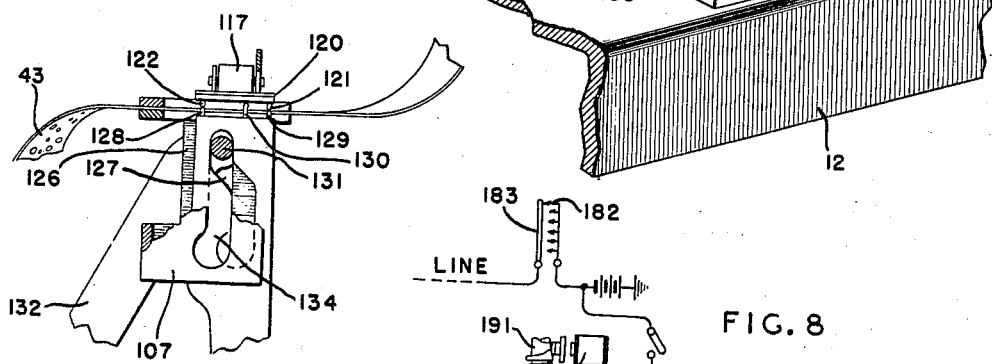
FIG. 8
INVENTOR.
ROSS A. LAKE
BY
H.B. Whitfield
ATTORNEY.

Nov. 11, 1941.   R. A. LAKE   2,262,012
TELEGRAPH TRANSMITTER
Filed July 18, 1938   5 Sheets-Sheet 2

INVENTOR.
ROSS A. LAKE
BY
H. B. Whitfield
ATTORNEY.

Nov. 11, 1941.  R. A. LAKE  2,262,012
TELEGRAPH TRANSMITTER
Filed July 18, 1938  5 Sheets-Sheet 3

INVENTOR.
ROSS A. LAKE
BY H.B. Whitfield
ATTORNEY.

Nov. 11, 1941.　　　　　R. A. LAKE　　　　　2,262,012
TELEGRAPH TRANSMITTER
Filed July 18, 1938　　　　5 Sheets-Sheet 5

INVENTOR.
ROSS A. LAKE
BY
H.B. Whitfield
ATTORNEY.

Patented Nov. 11, 1941

2,262,012

UNITED STATES PATENT OFFICE 2,262,012

TELEGRAPH TRANSMITTER

Ross A. Lake, Oak Park, Ill., assignor to Teletype Corporation, Chicago, Ill., a corporation of Delaware Application July 18, 1938, Serial No. 219,770

29 Claims. (Cl. 178—17)

The present invention relates to apparatus for the transmission of telegraph signals and more particularly to telegraph transmitters operated under the control of signal indicia on a strip.

An object of the invention is a telegraph transmitter for transmitting signals from a control strip wherein the strip is advanced through a rectilinear action.

Another object of the present invention is the provision of a transmitter for transmitting signals in accordance with control indicia on a control strip, which is capable of sensing the last applied indicia, and which does so with speed, simplicity, and reliability.

Another object of the invention is the provision of a strip-signal transmitter which includes an extremely light in weight and very flexible instrumentality capable of feeding at high speeds a relatively fragile signal control strip.

The above and other objects of the invention are accomplished by the provision either of a manually operated keyboard perforator or a signal controlled perforator operative in conjunction with a tape sensing mechanism including a plurality of sensing fingers set permutably in accordance with the perforations or control indicia in a previously prepared control strip to control the transmission of impulses symbolic of the character to be reproduced. The perforator to which the invention has been specifically applied comprises a plurality of key levers arranged to set permutably a plurality of bars which set correspondingly a plurality of interponents to control, upon the operation of a mechanically operated punch hammer, the operation of punches arranged in a transverse row to perforate a control strip in accordance with the code allocated to a depressed key lever. Cooperating with the code punches is a feed hole punch for inserting in the tape in advance of the code perforations a feed hole which cooperates with a tape feeding mechanism of the sensing unit to advance the tape therethrough step by step in order that the groups of perforations therein will be sensed successively.

The sensing mechanism includes, as previously outlined, sensing fingers which are mounted in a carrier capable of oscillation about a fixed pivot away from and toward the exit tape channel of the keyboard perforator. Normally, the tape entrance channel of the sensing unit is immediately adjacent the exit channel of the perforator and the tape passes directly from the perforator to the sensing unit without any exposed portion of the tape. When the perforator is operated, the tape feed mechanism thereof advances the tape and moves the sensing unit about its pivot a distance equal to the distance between the transverse rows of perforations to start a transmitting distributor which includes means to move the sensing unit toward the perforator to sense the new row of perforations. The sensing unit, through the sensing fingers, then senses the transverse row of perforations and controls, through appropriate levers, the operative position of a contact operating member individual thereto for effecting, upon the operation of a cam distributor, the transmission of impulses corresponding to the setting of the sensing fingers.

The sensing unit operates at a definite predetermined speed, whereas the perforator may be operated at a speed dependent upon its inherent limitations and the speed of the operator. If the perforator is operated at a speed higher than the speed of rotation of the transmitting cam shaft, the tape will be fed at a rate higher than the rate at which it is consumed by the sensing unit, in which case the sensing unit will be pushed in a counterclockwise direction about its pivot until it reaches a predetermined position when, if the perforator is continued to be operated at a speed higher than the speed of operation of the transmitting cam shaft, the tape will be formed in a loop extending between the sensing unit and the perforator.

With a cessation in the operation of the perforator occurs, the tape will continue to be advanced through the sensing unit by the tape advancing mechanism thereof. When the loop of the tape has been exhausted and the tape becomes taut between the sensing unit and the perforator and provided operation of the perforator is not resumed, the sensing unit, due to the cyclic operation of the tape advancing mechanism and its cooperation with the feed holes in the tape, will be moved in a clockwise direction toward the perforator and in such movement, which is step by step, the transverse rows of perforations will be sensed successively until the sensing head is brought in abutting relation to the perforator when mechanism is operated for discontinuing the operation of the tape advancing mechanism through arresting the rotation of the transmitting distributor cam drum.

The tape advancing mechanism, according to the present invention, includes elements operated cyclically in accordance with cams constituting a part of the transmitting distributor cam drum according to a rectilinear action. Included in the sensing unit and constituting a part of the tape feed mechanism is a slidably mounted member carrying at its upper extremity pins spaced corresponding to the spacing of the feed perforations and operated cyclically by a cam on the transmitting cam drum or sleeve to cause its pins to engage and disengage the feed perforations in the tape. The feeding movement of the noted element is achieved through the provision of a cam operated lever carrying at its extremity a pin which cooperates with a cam slot in the element carrying the pins which engage the feed perforations in the tape to cause the rectilinear movement thereof; that is, a movement whereby the pins thereof engage the next succeeding feed perforations in the tape to effect a relative movement between the sensing unit and the perforated tape. If the tape is taut, movement of the element carrying the pins will cause the sensing unit to move about its pivot toward the exit channel of the perforator. However, if the tape between the perforator and the sensing unit is not taut, the action of the recited element will be such as to cause the tape to be advanced step by step through the sensing unit until the tape becomes taut, when the condition previously described will be repeated; that is, the sensing unit will be moved in a direction whereby its tape entrance channel will approach and abut the tape exit channel of the perforator.

If the sensing unit, through the operations previously described, abuts the perforator and if operation of the perforator is resumed, the sensing unit will be moved about its pivot in a counterclockwise direction to repeat the operations previously described.

A better understanding of the invention may be had from the following description, taken in conjunction with the accompanying drawings, wherein—

Fig. 1 is a perspective view of the tape sensing unit and the signal transmitting unit;

Fig. 3 is a detailed view of the mechanism for effecting relative movement between the sensing unit and the perforated tape;

Fig. 8 shows diagrammatically the circuit connections of the apparatus; and

The perforator

Figure 7:
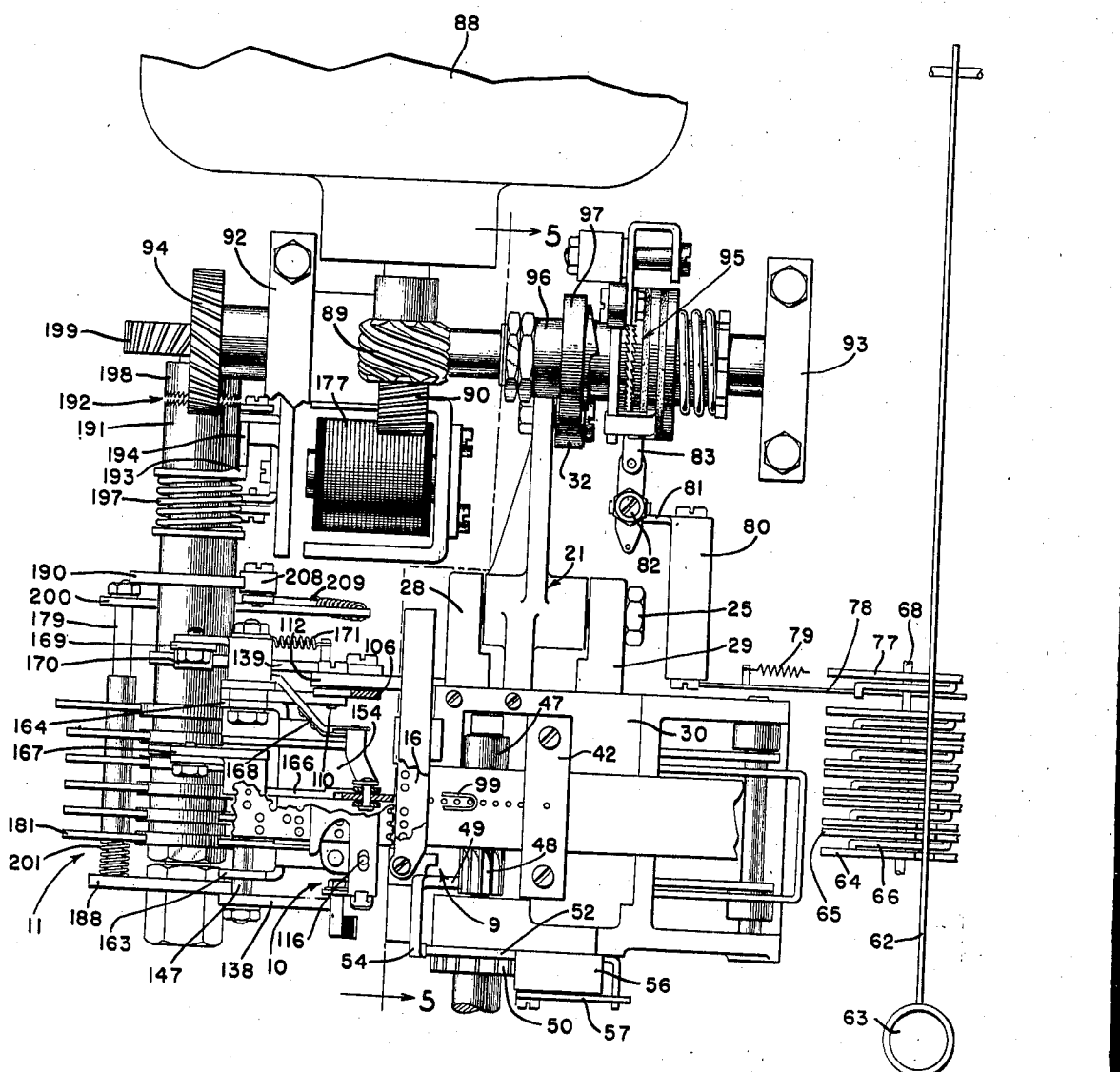
Fig. 7 is a partial plan view of the essential elements of the keyboard perforator, tape sensing unit and a signal transmitting device.
Figure 9:
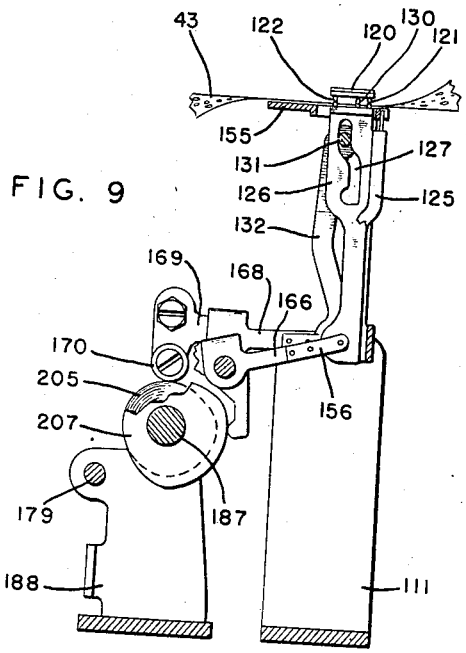
Figs. 9, 10, 11 and 12 illustrate the several positions of the mechanism through which the perforated tape is advanced.

The present invention may be considered as including three principal units, a tape perforator 9, a tape sensing unit 10, and a transmitting unit 11 (Fig. 7). Each of the several units is mounted on a base casting 12.

Figure 5:
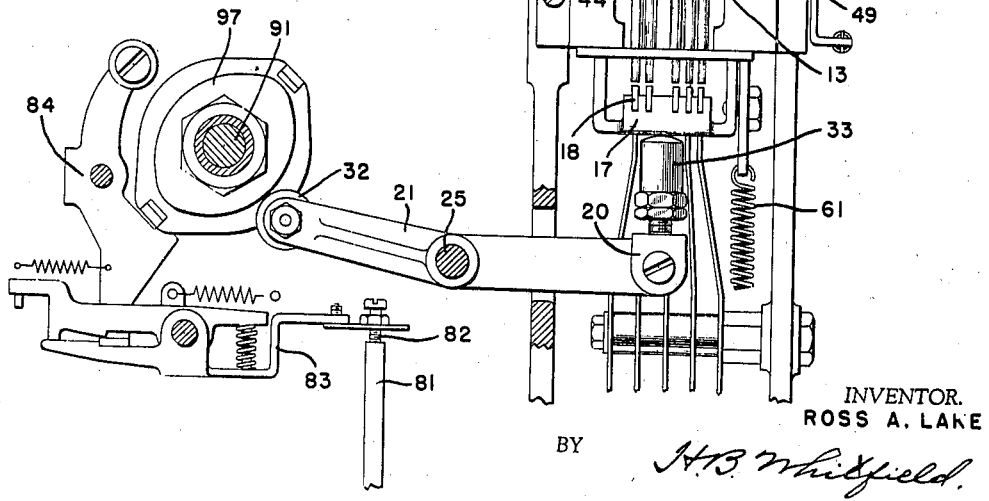
Fig. 5 is a sectional view taken substantially along the line 5—5 of Fig. 7.

The perforator shown (Figs. 2 and 5) comprises a set of punches 13 movable through openings in upper and lower guide plates 14 and 15 and cooperating with a die plate 16, the plates 14 and 16 being spaced apart to form a tape guide. The punches 13 are selectively operated by an actuating member or hammer 17 and a set of permutation bars or interponents 18 corresponding in number to the number of punches 13.

The hammer 17 is arranged to oscillate about a pivot 19 and is operated by arm 20 secured to one end of a lever 21 which is pivoted on rod 25 journaled in ears or projections 28 and 29 formed on the outer edge of a vertical wall 30 of a casting. Lever 21 carries at its opposite end a cam roller 32 which cooperates with a cam to operate cyclically hammer 17 and effect its oscillation and correspondingly the operation of the punch pins 13.

Figure 2:
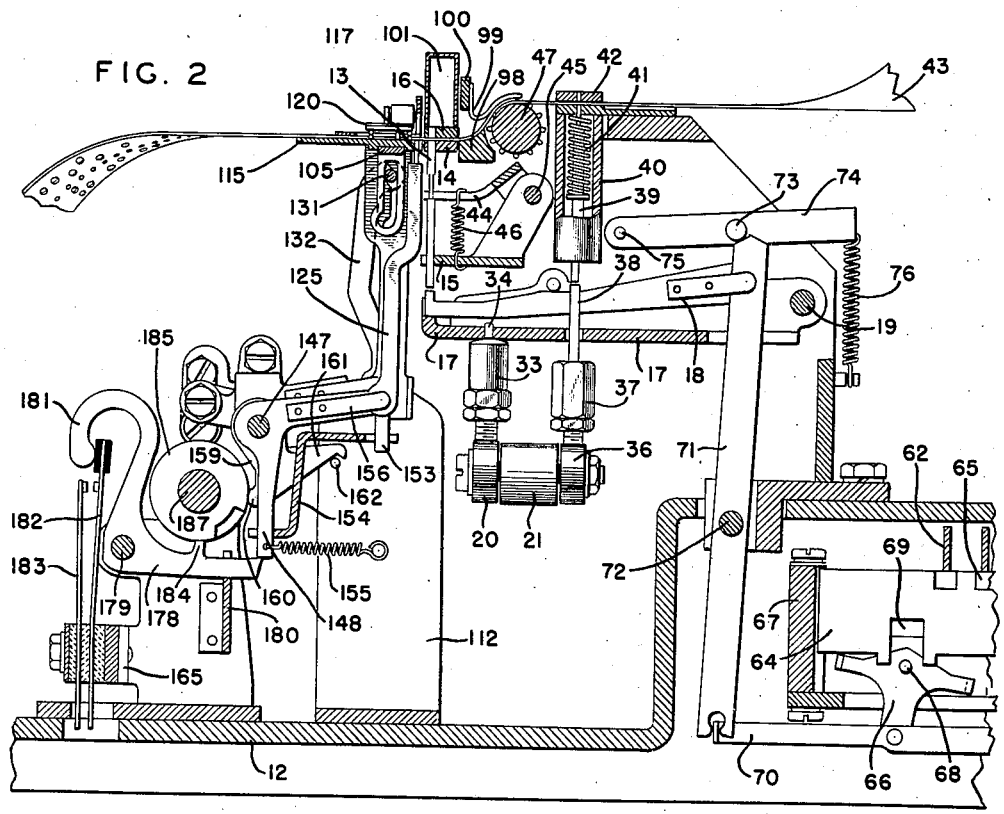
Fig. 2 is a front elevational view of the structure disclosed in Fig. 1.

As disclosed in Fig. 2, a sleeve 33 having a pin 34 is adjustably mounted on arm 20. Pin 34 extends loosely through an aperture in hammer 17.

Mounted oppositely to arm 20 is a second arm 36 which, like arm 20, carries an adjustable sleeve 37 which has an elongated pin 38 in alignment with a punch pin 39. Punch pin 39 is partially enclosed in a housing 40 which conceals a spring 41 arranged to subject punch 39 to spring tension and restore it to its normal position. Punch 39 is guided at its upper and lower extremities by guide plates and cooperates with a die plate 42 which is separated from the upper guide plate to form a tape guide. Punch 39 serves to apply to tape 43 the feed holes in advance of the application of the code perforations by code punches 13. It is thus seen that for each operation of lever 21, the hammer 17 will be oscillated about its pivot 19 and the feed hole punch 39 will be moved upwardly by pin 38 which extends through an aperture in hammer 17 to perforate the feed hole, and will be restored to the position shown in Fig. 2 by spring 41 following the restoration of lever 21 to the position shown in Fig. 2.

The interponents or permutation elements 18 are movable back and forth over the face of hammer 17 and are adapted to be positioned in different combinations with their outer ends either in operative positions beneath the corresponding punches 13 or in inoperative positions out of alignment with punches 13.

The free end of hammer 17 is upturned, which portion is slotted to form guide channels for the forward end of each of the interponents 18.

Upon each setting of the interponents 18, lever 21 is oscillated and hammer 17 is moved about its pivot to form a row of perforations in tape 43 through the actuation of punches 13 corresponding to the setting of the interponents 18. Also, upon the operation of arm 21, pin 38 will be actuated and feed hole punch 39 will be operated to perforate the feed hole in tape 43 in advance of the formation of the row of code perforations.

Withdrawal of the feed hole punch is achieved by spring 41, whereas the withdrawal of the code punches is accomplished by a stripper bail 44 which is pivoted at 45 and which has secured thereto one end of a retractile spring 46. As disclosed, the punch pins 13 are each provided with a shoulder which cooperates with the lower surface of spring actuated stripper bail 44 so that when the punches 13 are raised, stripper bail 44 will be moved about its pivot 45 against the action of spring 46 and without any binding action on the punches 13. When hammer 17 is returning to the position shown in Fig. 2, spring 46 is effective to withdraw the actuated punches 13 and restore them to their normal unactuated position.

As previously described, for each operation of lever 21, punch 39 is operated to form a feed hole adapted to be engaged by the pin teeth of a feed drum 47. The latter is provided with ratchet teeth 48 to be engaged by a feed pawl 49 which is pivotally mounted to hammer 17 and which is thus reciprocated upon each operation of the latter. A star wheel 50 and a knurled portion 51 which facilitates manual rotation are integrally formed and are secured to feed drum 47 by means of a nut. Formed on the outside of a bearing sleeve through which drum 47 passes is a disc 52 provided with a projection 53 arranged to cooperate with an arm 54 formed on feed pawl 49 and arranged with an arm 55 cooperating with a slot formed in a member 56 which is capabale of being depressed to cause the withdrawal of feed pawl 49 from cooperation with teeth 48 and to back step the feed drum 47 to present a previously perforated row of perforations in alignment with the code punches 13. A spring tensioned lever 57 pivoted on member 56 cooperates with star wheel 50 to back space the feed drum 47 and in turn the tape 43.

A spring 61 connected to the lower extremity of feed pawl 49 serves to hold the feed pawl in engagement with ratchet teeth 48 of the feed drum and also normally holds the hammer 17 against the adjustable sleeve 33. When hammer 17 is moved in a clockwise direction by the action of lever 21, spring 61 is extended. Consequently, when the force on lever 21 is relieved, the energy stored in spring 61 is released and the hammer 17 is restored to the position shown in Fig. 2. Feed pawl 49 will also be restored and in being so moved, will rotate feed drum 47 to advance the tape 43 to present a succeeding area thereof in alignment with the code punches 13. It is thus seen that for each operation of hammer 17, feed drum 47 will be rotated and the tape 43 will be advanced step by step.

The interponents or permutation elements 18 are set in different combinations by a plurality of key levers 62 suitably mounted on a pivot rod and normally upheld in raised position by individual springs, the levers being provided at their forward ends with key tops 63.

Beneath the key levers extend a number of pairs of code bars, and since in the form shown there are five interponents 18, a corresponding number of pairs of code bars are employed. Each pair comprises a bar 64 and 65 and each pair of bars is supported adjacent to each end by a rock arm 66. Each bar has its ends guided by oppositely disposed guide combs 67. These rock arms are pivotally mounted on a shaft 68 secured to a block 69 which extends transversely of the bars 64 and 65 and which is arranged with a plurality of slots, one for each rock arm 66. A similar block (not shown) is positioned adjacent the right-hand end of bars 64 and 65, as viewed in Fig. 2, which, too, carries a shaft 68 constituting a pivot for correspondingly shaped rock arms and which also serves to limit the endwise movement of bars 64 and 65. One pair of rock arms is interposed between each two code bars comprising a pair, and the bars are held in proper spaced relation by the guide combs, one of which is shown at 67. The rock arms 66 are substantially T-shaped or widened at their upper ends and are provided with offset lugs on opposite sides of and spaced some distance from the shaft 68. One of the lugs of each arm projects forwardly into a notch on the lower edge of the corresponding code bar 64 and its other lug projects rearwardly beneath the lower edge of the corresponding code bar 65. With this arrangement, the depression of either bar of a pair of code bars rocks the arms and lifts the other code bar.

Each pair of rock arms 66 is pivoted to a longitudinally movable permutation bar 70. In the form disclosed, each bar 70 is connected to its individual lever 71, which are pivotally mounted on shaft 72 and which have their upper end connected to their interponent 18; that is, individual to each bar 70 and its companion interponent 18 is a lever 71, so that for each movement of bar 70, corresponding movement of interponent 18 results.

Cooperating with the upper ends of lever 71, which are beveled, is a rod or roller 73 secured to a U-shaped member 74 pivoted on rod 75 and urged into cooperation with the beveled end of each of the levers 71 by a spring 76. Rod 73 serves as a detent for levers 71.

Each of the key levers 62 which extends across the code bars 64—65 is arranged, when operated, to engage and depress one of the code bars of each pair and thereby set the same and the permutation bars 70 and interponents 18 in a characteristic combination. Correspondingly, the punches 13 will be operated in the same characteristic combination upon the operation of hammer 17 through lever 21.

For effecting the operation of the punches 13 through the interponents 18, each key lever 62 is arranged to depress a universal bar 77 which is slidably mounted in the same manner as the code bars 64—65 and also cooperates with a pair of rock arms secured to a connecting link 78 to operate under the tension of a spring 79 a bail 80 which constitutes a part of the release mechanism effective for controlling the application of power to lever 21. As disclosed in Fig. 5, an arm 81 of bail 80 engages an adjusting screw 82 fixed in one end of pivoted arm 83 to rotate, when the connecting link 78 is shifted, arm 83 and remove the stop projection from the path of spring operated latch 84 and allow application of power to the cam for operating lever 21. The form of the release mechanism may correspond to that disclosed in Patent No. 2,019,505 to A. H. Reiber of November 5, 1935, and consequently reference is made to such patent for a full and complete understanding of the construction and operation of the release mechanism which is operated by the universal bar 77 upon the depression of any of the key levers 62.

As disclosed in Fig. 7, an electric motor 88 has on its shaft a gear 89 which meshes with a gear 90 (Figs. 7 and 4) secured to a shaft 91 journaled in bearings 92 and 93. Also secured to shaft 91 is a gear 94 and the driving portion of a friction and positive clutch 95. Through the friction and positive clutch 95 a sleeve 96 on shaft 91 is rotated. Secured to sleeve 96 is a cam 97 which cooperates with roller 32 mounted on one arm of lever 21.

Upon the depression of any of the key levers 62, the code bars 64—65 will be operated as will the universal bar 77 to effect the operation of the clutch release mechanism. Upon the operation of such mechanism, clutch 95 is effective, whereupon power is communicated to sleeve 96 and thus to cam 97. As cam 97 rotates, lever 21 is operated to actuate hammer 17 against the action of spring 61. It is thus seen that, for each operation of a key lever, the code bars 64—65 will be set in a characteristic combination, that the interponents 18 will be correspondingly set; that the clutch 95 will be effective and power will be applied to cam 97, and that through cam 97 the hammer 17 will be moved in a clockwise direction, as viewed in Fig. 2, to cause code punches 13 to perforate the tape and punch 39 to perforate the feed hole, following which the hammer 17 is restored to its normal position by the action of spring 61, which serves also to advance the feed drum 47 through the operation of feed pawl 49 to advance tape 43 to present the succeeding area thereof in alignment with punches 13.

Between feed drum 47 and the entrance end of the tape guide formed between the plates 14 and 16 is a member 98 which has its upper surface curved to direct the tape from the feed wheel to the entrance of the tape guide in cooperation with a wire loop 99 formed to correspond with the contour of drum 47 and arranged to hold the tape firmly against the drum 47. The wire loop 99 is fastened to an arm 100 which is pivoted to permit the wire loop 99 to be moved free of the feed drum 47. Positioned above the code punches 13 is a chaff or chad chute 101.

The sensing unit

The sensing unit includes two substantially L-shaped side members 105 and 106, each of which, as shown in Fig. 1, has a horizontally projecting portion 107 which are spaced by a metallic spacer and which are joined by welding or riveting.

Figure 4:
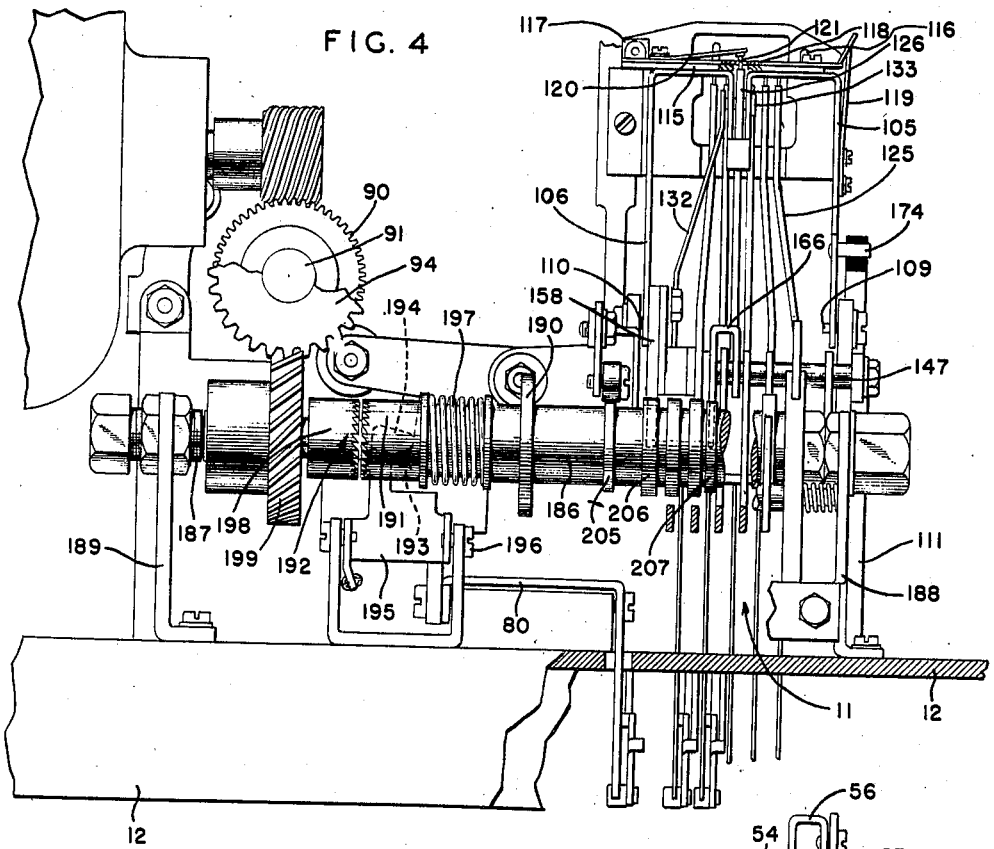
Fig. 4 is an end elevational view of the structure disclosed in Fig. 7.

The sensing unit which includes the frames 105 and 106 is pivoted, as shown in Fig. 4, on pivot pins 109 and 110 in a manner to permit free oscillation of the sensing unit. The pivot pins 109 and 110 are secured to vertically extending side members 111 and 112 which are fastened to the base casting 12.

The sensing unit, as disclosed in Fig. 2, normally abuts the plates 14 and 16 of the perforator and has its entrance channel for the perforated tape in alignment with the exit channel of the tape guide formed between plates 14 and 16. Extending between and secured to the side frames 105 and 106 is a plate 115 which carries a pilot post 116 and a hinge block 117. Hinged to block 117 is a tape gate 118 which has an aperture in alignment with pilot post 116 and which cooperates when in a horizontal position with a spring latch 119 which holds it in its operating position. Secured to the gate 118 by a screw is a reed spring 120 which carries at its free end two pins 121 and 122, Fig. 1.

The plate 115 has its upper surface depressed or grooved to form a channel for the tape as it passes through the sensing unit and has adjacent its right-hand edge, as viewed in Fig. 2, a plurality of apertures. Likewise, the right-hand edge of the gate 118 has a plurality of notches in alignment with the apertures in plate 115 when the gate is latched by latch 119.

The apertures in plate 115 receive the reduced portion of a sensing pin 125; that is, there is a sensing pin 125 individual to each of the apertures adjacent the right-hand edge of plate 115. Inasmuch as there are five code punches 13 there will be a corresponding number of sensing fingers 125; for example, there will be a sensing finger or pin 125 for each of the possible perforations appearing in a transverse row of perforations.

The separation between the code punches 13 and the apertures in plate 115 when the plate 115 abuts the plates 14 and 16 corresponds to the normal spacing between successive transverse rows of perforations in tape 43. Usually the transverse rows of perforations in tape 43 are one-tenth of an inch apart and therefore the punches 13 and the apertures in plate 115 are correspondingly separated. Intermediate the upper legs of the frame members 105 and 106 and in the space formed by the metallic spacer is a slidably movable member 126 which is formed with a cam groove 127, Fig. 3, and which carries on its upper extremity pins 128, 129, and 130. Pins 128 and 129 are of the same length but pin 130, as shown in Fig. 3, is considerably longer than pins 128 and 129, the purpose of which will appear more clearly hereinafter. Cooperating with the cam groove 127 in member 126 is a pin 131 secured to the free end, Fig. 4, of a cam operated arm 132. The pin 131 has an enlarged head 133, as shown in Fig. 4, to insure that the pin 131 will not be accidentally displaced from the cam groove 127.

As shown in Fig. 3, the downwardly projecting legs of portion 107 of the side frames 105 and 106 are arranged with straight slots 134 to confine the movement of pin 131 in a vertical plane. To facilitate removal of pin 131, the lower portion of cam groove 127 and the lower portion of the slots 134 in the legs of portions 107 are enlarged sufficiently to receive the head 133 of the pin 131.

As will be described hereinafter, member 126 and arm 132 are operated in timed relation. Arm 132 is drawn downwardly in the slots 134 and when so drawn and due to the particular shape of cam groove 127, member 126 will be moved to the left as viewed in Figs. 7 and 1, and relative movement between the sensing unit 10 and the tape 43 will be effected. Member 126 then is moved downwardly to withdraw pins 128, 129, and 130 from engagement with the feed perforations in the tape 43. Following this action, arm 132 is moved upwardly and due to the camming action, member 126 is moved to the right as viewed in Figs. 7 and 1. The member 126 is thereafter elevated to cause the pins 128, 129, and 130 to engage other feed perforations in the tape 43 to achieve, on a subsequent cycle, relative movement between the sensing unit 10 and the perforated tape 43.

Secured to the side members 111 and 112 are L-shaped members 138 and 139, respectively. Extending between the L-shaped member 138 and 139 is a pivot shaft 147 on which is mounted a plurality of bell crank levers 148, 149, 150, 151, and 152, Fig. 1. These bell crank levers are individual to a sensing finger 125. As disclosed, the sensing fingers 125 are pivotally secured to one arm of their respective bell crank lever on a center line substantially coincident with pivots 109 and 110. The bell crank levers have an extension 153, Fig. 1, cooperating with a pivotally mounted guide comb 154. Fastened to the other arm of the bell crank levers is a retractile spring 155, Fig. 6, which serves to rotate its bell crank in a counterclockwise direction, as viewed in Figs. 2 and 6, and to move its sensing finger 125 vertically to sense the perforations in tape 43. If a perforation appears opposite a sensing finger 125, it moves to its fullest extent, whereas if there is no perforation in alignment therewith, its movement is correspondingly restricted.

To facilitate assembly, each of the sensing fingers 125 is provided near its lower extremity with an aperture arranged to be engaged by a pin secured near the end of the horizontally extending arm of each of the bell crank levers 148—152. A reed spring 156, Fig. 2, riveted to such arm of the bell crank lever, serves to retain the lower end of the sensing finger and prevent its accidental displacement.

Guide comb 154 which is normally under the tension of a spring 157, one end of which is fastened to a spring post secured to member 111 and the other end secured to the horizontal projection of the guide comb 154, has ears 163 and 164, Fig. 1, apertured to receive pivot shaft 147 and arranged to permit the free rotation of comb 154 against the tension of its retractile spring 157. The left-hand ear 164 of guide comb 154, as viewed in Fig. 1, is secured to an arm 158, Fig. 4, of a T-shaped lever 159, Fig. 2. Arm 160 of T-lever 159 cooperates with a cam for moving cyclically comb 154 about pivot shaft 147 for the purpose later to be described. Arm 161 of T-lever 159 cooperates with a pin 162 to limit the movement of comb 154 against the action of spring 157. Also rotatably mounted on pivot shaft 147 is a lever 166 which has one end fastened to member 126 and which has its other end secured to a bell crank lever 167 also pivotally mounted on shaft 147 and having an arm which cooperates with a cyclically operated cam to effect reciprocal movement of member 126. Also pivotally mounted on shaft 147 is an arm 168, Figs. 7 and 1, which is secured to lever 132 and which is fastened through an arm 168 to a lever 169 carrying a cam roller 170 which is held in cooperation with its cam by a spring 171 having one end secured to an arm of the lever carrying roller 170 and the other end secured to a spring post on upright 112. Secured to side frame 105, Figs. 4 and 1, is a pin 174 which cooperates with the insulated end of an electrical contact spring 175 which cooperates with an electrical contact spring 176 to complete the energizing circuit for a control electromagnet 177.

The transmitting unit

Figure 6:
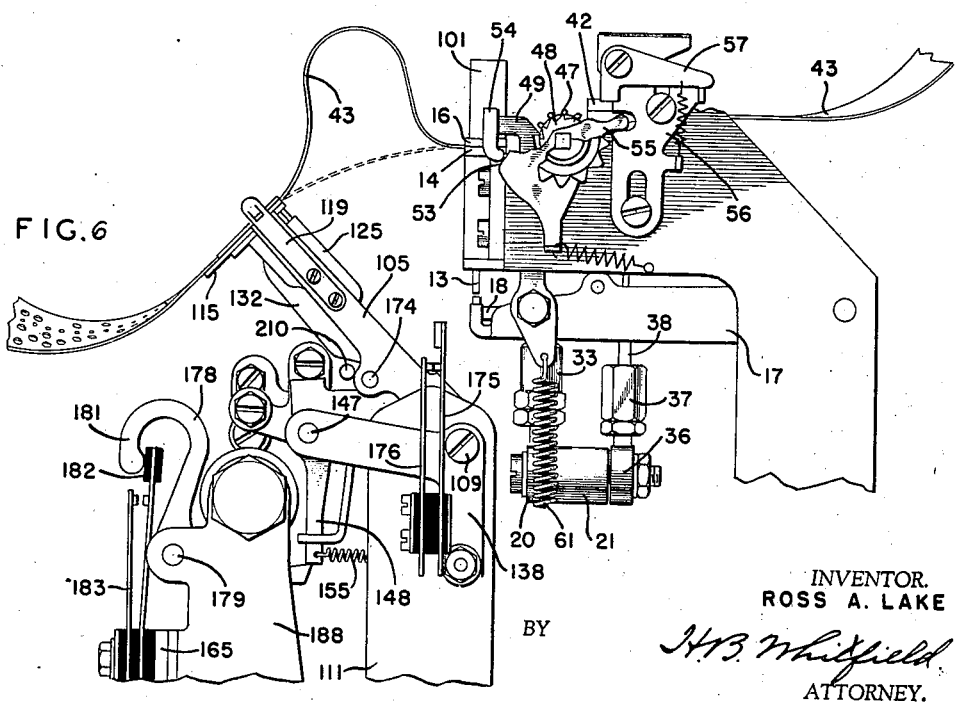
Fig. 6 is another view of a part of the structure disclosed in Fig. 2 but showing the sensing unit displaced from the perforator.

Individual to each of the bell cranks 148—152 is a bell crank lever 178, Figs. 6 and 1, pivoted on a shaft 179 and held in proper position by spacing washers on shaft 179 and by a guide comb 180, Fig. 2.

Each bell crank lever 178 has a hook 181 at its upper end which engages the insulated upper end of a spring contact 182 and each of the latter cooperates with a contact spring 183, the pairs of contact springs being mounted upon but insulated from a supporting bar 165, Fig. 2, carried by the base casting 12. Each spring contact 182 tends to engage its associated contact spring 183 and also serves to hold a lug 184 on the horizontal arm of the corresponding bell crank lever 178 in engagement with the surface of a cam drum 185 serving as the signal transmitting cam assembly and forming a part of a cam sleeve 186 on a horizontal shaft 187 and extending over the horizontal arms of the bell crank levers 178. The cam drum 185 is provided with a helical series of slots which, as the cam drum is rotated, successively pass over the lugs 184 of the bell crank levers 178. As the corresponding recess passes over one of the lugs, the associated switch contacts 182 and 183 are closed, provided the horizontal arm of the bell crank lever 178 is not restricted in its movement.

The shaft 187 is journaled in end plates 188 and 189, Fig. 4. On the sleeve 186 carrying cam or cam drum 185 is a shoulder or cam 190, Fig. 7. Sleeve 186 is splined to a driven portion 191 which constitutes a part of a positive clutch 192 through which power is communicated to sleeve 186. The driven portion 191 of the clutch has integrally formed therewith a cam surface 193 which cooperates with an extending portion 194 of a bail or clutch throwout lever 195 pivoted at 196 and functions as a clutch disengaging means. The laterally extending portion 194 of bail 195 cooperates with the armature of electromagnet 177 which, when energized, withdraws the horizontal projection 194 of bail 195 free of the cam surface 193 and its horizontal projection to allow portion 191 to be shifted by spring 197 into cooperation with the driving portion 198 of the clutch 192, which is secured to shaft 187 on which is mounted a gear 199, the latter being meshed with gear 94 and driven continuously from power supplied by motor 88. Normally, of course, spring 197 tends to move the driven portion 191 into cooperation with the driving portion 198 of the positive clutch but is prevented from such movement due to the horizontally extending portion 194 of bell crank lever 195 with the projection 193 on the cam surface. Consequently, the transmitting cam sleeve or drum 186 which carries the cams 185 is normally held against rotation by the stop member or bell crank lever 195 which is held in such position upon the deenergization of electromagnet 177.

End plate 188 also supports one end of shaft 179, the other end of which is supported in plate 200 which, like plate 188 is secured to the base casting 12. Also as shown in Fig. 7, a spring 201 surrounds shaft 179 and is positioned between plate 188 and the first of the bell crank levers 178 to permit slight lineal movement along shaft 179.

Also secured to cam sleeve 186 are cams 205, 206, and 207. Cam 205 operates on roller 170 carried by a lever 169 to move arm 168 and, through it, arm or connecting link 132. Cam 206 operates on arm 160 of T-shaped lever 159 to rotate guide comb 154 against the tension of its spring 157 to permit movement of the bell crank levers 148—152 by the action of springs 155 about pivot shaft 147 in a counterclockwise direction, as viewed in Fig. 2, and to insert the sensing fingers 125 in the perforations in the tape 43. During a subsequent portion of its cycle, cam 206 allows spring 157 to move comb 154 through which bell crank levers 148—152 are rotated about shaft 147 in a clockwise direction, as viewed in Fig. 2, and thus withdraw the sensing fingers 125 free of tape 43. As cam 207 rotates, it cooperates with arm 167 secured to lever 166 which, in turn, is secured to member 126 which through the action of cam 207, is reciprocated to cause the pins 128, 129, and 130 to disengage and engage successively the feed perforations in tape 43.

As previously described, cooperating with each of the bell crank levers 178 is a bell crank lever 148, 149, 150, 151, and 152 which are positioned in accordance with the positions assumed by their associated sensing fingers 125. If a sensing finger 125 is held depressed, which will be the position it assumes if a perforation is not aligned therewith, the free end of its bell crank lever lies in the path of the horizontal arm of its bell crank lever, such as 178. Thus, when the recess in cam 185 aligns with lug 184, the bell crank lever such as 178 is held against movement and the contacts 182 and 183 will be held open. However, if a sensing finger 125 is allowed to ascend, which results from the presentation of a perforation in alignment therewith, its associated bell crank lever such as 178 is released upon the presentation of the recess of cam 185 thereto, which results in the closure of contacts 182 and 183.

As sleeve 186 rotates, the recesses in cam 185 are presented successively to the lugs 184 on the ball crank lever 178 and the contacts 182 and 183 will be operated in a manner corresponding to the position of the sensing fingers 125; that is, if the sensing fingers 125 sense a perforation in the tape 43, the associated bell crank levers 178 will be operated for effecting the sequential closure of contacts 182 and 183. However, if no perforation is sensed, then the contacts 182 and 183 will not be allowed to close but will be held open in the position shown in Fig. 2.

The periphery of shoulder or cam 190 is formed with a recess to be entered by a roller 208, Fig. 7, carried by a spring biased arm 209 suitably pivoted to the frame. The purpose of the cam surface on cam 190 and particularly the recess therein in cooperation with roller 208 is to prevent singing or chattering of the clutch comprising driven portion 191 and driving portion 198 during periods of arrestment of the latter and to control the initial rotation of cam 185. Since spring 197 opposes the disengagement of driven clutch portion 191 from driving portion 198, a slight torsional bias may be required to establish and maintain a gap between the clutch portions after bare disengagement has occurred, it being understood that disengagement and separation of the clutch portions results solely from rotation of clutch throwout cam surface 193 against the stop member 194. Cooperation of roller 208 with the descending slope of the recess in the periphery of cam 190 provides the desired torsional bias.

Control of the initial rotation of cam drum 185 is important because very early in a cycle of rotation it controls one of the bell cranks 178 to impress upon the telegraph line the start impulse, the effect of which is to set in operation any telegraph printer connected to the line. If cam drum 185 should be permitted to be rotated far enough to initiate the start impulse before firm engagement of the clutch portions is established, as, for example, by frictional engagement of the tips of the clutch teeth, distortion of some portion of the signal combination to be transmitted is likely to result due to subsequent slipping of the clutch portions into firm engagement and accompanying variation in the velocity of cam drum 185. The immediate establishment of firm engagement between the clutch portions 191 and 198 may be assured by exerting upon the driven clutch portion 191 a drag sufficient to resist rotation due to frictional engagement between the teeth of the positive clutch 192. The desired drag is furnished by engagement of roller 208 with the periphery of cam 190 and particularly with the sharp ascending slope of the recess therein which roller 208 encounters substantially immediately upon the tripping of stop member 194.

Electromagnet 177 is controlled by contacts 175 and 176 which are insulatedly mounted to a frame member. Contact spring 175 carries at its free end an insulator arranged to be engaged by pin 174 mounted in the side frame 105. When the frames 105 and 106 are in the position shown in Fig. 2 with the plate 115 abutting plates 14 and 16 of the perforator, pin 174, as shown in Fig. 1, holds contact 175 free of contact 176. Instantly that the sensing unit 10 is moved counterclockwise about its pivot, which occurs upon the operation of the perforator and the advancement of the tape therefrom, pin 174 moves free of contact 175 and contacts 175 and 176 are thereupon closed to cause the energization of electromagnet 177. Electromagnet 177 is thereupon energized and through its armature, withdraws latch 194 through the operation of lever 195 from engagement with stop lug 193 to allow spring 197 to move driven portion 195 rearwardly, as viewed in Fig. 7, or to the left as viewed in Fig. 4, to engage the driving portion 198 of the positive clutch. Sleeve 186 and the cams secured thereto are thereupon rotated.

*Operation*

For the purpose of clarity, let it be assumed that all of the characters previously perforated in the tape 43 have been transmitted and that the sensing unit 10 has been moved to a position where its tape entrance channel is immediately adjacent the exit channel of the perforator; that is, the plate 115 of the sensing unit abuts the plates 14 and 16 of the perforator. Under such circumstances, contacts 175 and 176 are opened and electromagnet 177 is deenergized, which results in stoppage of sleeve 186.

If, under such conditions, the keyboard perforator is operated through the depression of its key levers, the permutation bars 64—65 will be set permutably. For each depression of the key lever, mechanism is operated for rendering clutch 95 effective, whereupon power is communicated to sleeve 96 and in turn to cam 97. The permuted setting of the permutation bars 64—65 causes a corresponding setting of interponents 18 through the actuation of levers 71 which, through the roller 73 by the action of spring 76, will be held in their set position and certain of the interponents 18 will be positioned beneath and in alignment with the punches 13. Cam 97 now being rotated causes the operation of lever 21, which, through adjustable sleeve 33, operates hammer 17 and through adjustable sleeve 37 and pin 38 operates punch 39 against the action of spring 41 to perforate a feed hole in tape 43. Operation of hammer 17 causes the movement of punches 13 through the interponents 18 which have been positioned to the right, as viewed in Fig. 2, to perforate tape 43 with a transverse row of perforations symbolic of the character identified with the depression of the key lever which caused the setting of the permutation bars 64 and 65. As hammer 17 moves vertically, stepping pawl 49 is brought into engagement with the next succeeding tooth of ratchet portion 48. As cam 97 continues its rotation, spring 61 becomes effective to restore hammer 17 and stepping pawl 49 to their normal position or the position shown in Figs. 2 and 6. The downward movement of stepping pawl 49 causes pin drum 47 to rotate in a counterclockwise direction, as viewed in Fig. 6, and advance the tape 43 a distance determined by the distance between succeeding teeth on ratchet 48.

The advancement of tape 43 causes the movement of the sensing unit 10; that is, the frames 105 and 106, about its pivot a distance equal to the distance through which the tape is advanced.

The indicated movement of the sensing unit frees pin 174 from the insulated portion of contact spring 175 and allows the closure of contacts 175 and 176 to complete the energizing circuit for electromagnet 177. Electromagnet 177 withdraws, through pivoted lever 195, stop latch 194 from the stop lug 193 which permits driven portion 191 to slide, by the action of spring 107, into engagement with driving portion 198 of the clutch. Until the driven and driving portions of the clutch are fully engaged, rotation of sleeve 186 is prevented due to the cooperation of roller 208 with cam 190. However, when the driven and driving portions 191 and 198 of the clutch are fully engaged, sleeve 186 rotates.

As sleeve 186 rotates, cams 185, 190, 205, 206, and 207 are rotated for achieving their respective functions. Cam 205 is effective on roller 170 to operate lever 169 through which arm 168 is operated to draw link 132 downwardly. As link 132 is drawn downwardly, its pin 131 cooperates with cam groove 127 to move member 126 leftwardly, as viewed in Figs. 1, 2, and 3, or away from the plates 14 and 16 it, of course, being understood that the pins 128, 129, and 130 thereof are at that instant in engagement with feed perforations in tape 43.

Due to the cam groove in member 126 a mechanical resiliency exists between the member 126 and the frame including the side members 105 and 106. Consequently, the side members 105 and 106 with the plate 115, inasmuch as the tape between the sensing unit and the perforator is taut, moves toward the exit channel of the perforator or to the right, as viewed in Fig. 2, to present the sensing fingers 125 in alignment with the transverse row of perforations in tape 43 inserted as a result of the instant operation of the perforator.

Following the effectiveness of cam 205 or during the period of its effectiveness on link 132, a cam 185 becomes effective on bell crank lever 178 to allow the contacts 182 and 183 allocated to the start and stop impulses, which are normally closed, to open to transmit a start impulse for effecting an operation in the receiving printer electrically connected to the transmitter previously described. Significant, of course, is the fact that the contacts 182 and 183 allocated to the start and stop impulse conditions are operated invariably at the beginning and near the end of the cycle of rotation of cam drum 185 to transmit, respectively, a start impulse and a stop impulse for achieving their allocated functions.

Cams 206 and 207 which, as previously described, are integral with sleeve 186 and are rotated in timed relation with cams 185, become effective for the performance of their respective function. Cam 206 operates, through lever 164 and T-shaped lever 159 having the arms 160 and 161, comb bail 154, which allows the sensing fingers 125 under the action of their individual springs 155, to assume positions in accordance with the code perforations in tape 43. If a sensing pin encounters a perforation in tape 43, its bell crank lever 148—152 moves to the right, as viewed in Figs. 6 and 1, under the action of its spring 155 to free its bell crank lever 178. As cam sleeve 186 continues its rotation, the cam 185 for the particular bell crank lever 178 which was released by the operation of bell crank lever 148—152 will allow the closure of contacts 182 and 183 for the transmission of an impulse indicative of such setting. As the cams 185 continue through their cycle of rotation, the bell crank levers 178 will be rendered effective sequentially for the transmission of impulses dependent upon the position assumed by the sensing fingers 125 as determined by the perforations in tape 43.

Following the transmission of the last impulse of the signal combination represented by the transverse row of perforations in tape 43, cam 206 becomes effective for allowing, through lever 164 and T-lever 159, spring 157 to operate comb bail 154, to rotate the bell crank levers 148—152 about their pivot 147 in a clockwise direction, as viewed in Fig. 2, and thus withdraw the sensing fingers 125 from engagement with the tape 43 preparatory to a subsequent cycle of operation.

Cam 207, as previously described, operates through lever 167 and in turn lever 166, member 126 which carries the pins 128, 129, and 130. As cam 207 rotates, member 126 is drawn downwardly through the operation of levers 166 and 167 to free pins 128, 129, and 130 from the feed hole perforations in tape 43. Concurrently, pins 121 and 122 secured to the underside of reed spring 120 engage feed perforations in tape 43 and thus hold the tape and the sensing unit against relative movement.

After the pins 128, 129, and 130 have been withdrawn from the feed perforations in tape 43, cam 205 operates, through lever 169 and arm 168, link 132 upwardly to move pin 131 in the cam groove 127 of member 126 and the straight slots in the portions 107 of the side members 105 and 106. Due to the contour of cam groove 127 and because the pins 128, 129, and 130 are then free of the feed perforations in tape 43, member 126 will be moved to the right, as viewed in Fig. 2, or toward the plates 14 and 16 of the perforator. In such a position the pins 128, 129, and 130 are below other feed perforations in tape 43 and will engage such perforations upon the upward movement of member 126.

Cam 207 continues its rotation and due to its contour, moves member 126 through levers 166 and 167 upwardly, causing the pins 128, 129, and 130 to enter other feed perforations in tape 43 for repeating the operation previously described upon the initial operation of the perforator.

As disclosed in Fig. 3, pin 130 is substantially longer than pins 128 and 129 and thus will engage the under surface of reed spring 120 and move it about its pivot to free pins 121 and 122 from the feed perforations in tape 43. Pin 130 having engaged a feed perforation prior to the engagement of pins 128 and 129 with feed perforations and prior to the disengagement of pins 121 and 122 from the feed perforations, tape 43 will be held against accidental displacement and will be maintained in proper alignment with the sensing fingers 125. Also, when member 126 is lowered and the pins 128 and 129 are moved free of feed perforations and prior to the engagement of pins 121 and 122 with the feed perforations corresponding to those previously engaged by pins 128 and 129, respectively, pin 130 will prevent the displacement of tape 43. Such a construction insures also that the feed perforations will not be mutilated and also insures that the tape will be properly spaced between successive code perforations to enable the transmission of signals corresponding to the setting of the sensing fingers 125.

The withdrawal of pins 128, 129, and 130 from the feed perforations, the upward stroke of link 132, and the reinsertion of pins 128, 129, and 130 in feed perforations are achieved by their respective cams during the transmission of the code combination of impulses indicative of the setting of the sensing fingers 125.

The particular operation of the mechanism for advancing the perforated tape 43 through the sensing unit or for causing the sensing unit to move along the perforated tape under predetermined conditions until it abuts the punch block of the perforator is illustrated further in Figs. 9, 10, 11, and 12. The indicated figures of the drawings show the mechanism in its several positions of operation. As disclosed in Fig. 9, the mechanism is in its normal or idle position wherein the cams 205 and 207, which are mounted on cam drum 186, are in their normal or stop position. Under such conditions member 126 is in its uppermost vertical position wherein pin 130 is in engagement with the under surface of reed spring 120 and holds it in a position where its pins 121 and 122 are free of the feed perforations in tape 43. Also, sensing finger 125 is in its retracted position.

Figure 10:
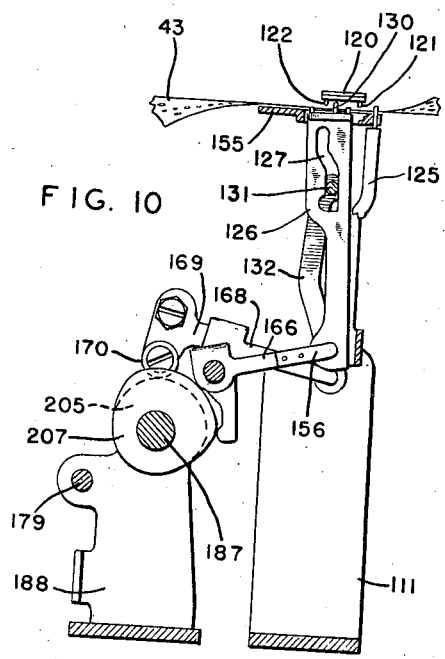

Upon the release of cam drum 186, cam 205 rotates and through cam roller 170 levers 168 and 169 are rotated about their pivot to stroke link 132 downwardly and thus move pin 131 in groove 127 of member 126 until the position shown in Fig. 10 is reached. Due to the movement of pin 131 in groove 127 of member 126, the latter member is moved to the position shown in Fig. 10 and, due to the engagement of pin 130 with a feed perforation in tape 43, the tape will be advanced a distance equal to the spacing between transverse rows of perforations in the tape. During such operation, cam 207 does not effect movement of member 126.

Figure 11:
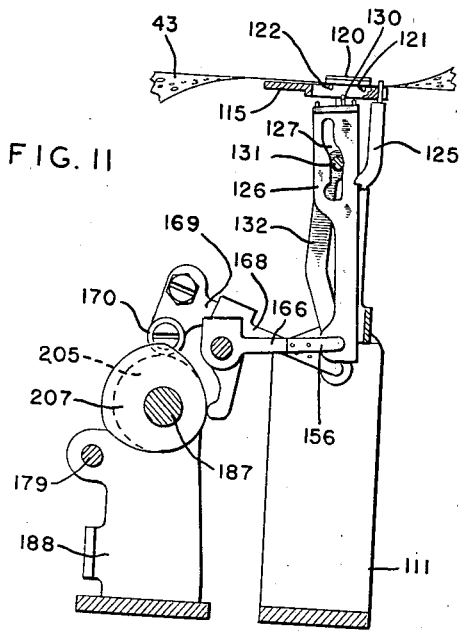

Following the movement of member 126 to the position shown in Fig. 10, cam 207 is effective for moving member 127 through bell crank lever 166 downwardly until the position illustrated in Fig. 11 is reached. When in such position pins 121 and 122 of reed spring 120 have engaged feed perforations in tape 43 to retain the tape in its advanced position.

Figure 12:
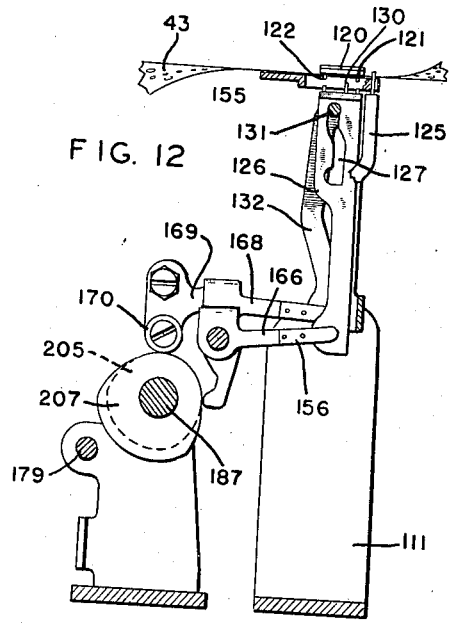

Cam 205 then is effective to stroke link 132 through its levers 168 and 169 upwardly, moving pin 131 correspondingly in groove 127 of member 126. By such action and because of the shape of groove 127, the member 126 will be moved about its pivot to the right until the position shown in Fig. 12 is reached, when cam 205 moves member 126 vertically through its bell crank lever 166 to the position shown in Fig. 9.

The operations described in connection with Figs. 9 to 12, inclusive, are repeated for each successive cycle of rotation of cam drum 186.

If, during the cycle of rotation of cam sleeve 186 just described there has been no further operation of the key levers 62, the sensing unit remains in abutting relation with the plates 14 and 16. Pin 174 will have operated contact 175 to cause its disengagement with contact 176. The energizing circuit for electromagnet 177 is thereupon opened, and stop latch 194 is moved into the path of stop lug 193 which, when engagement is effected, the driven portion 191 against the tension of spring 197 will be moved to the right, as viewed in Fig. 4 and rotation of sleeve 186 is arrested. However, if during the cycle of rotation of cam sleeve 186 another key lever 62 or other key levers 62 have been depressed, tape 43 will be advanced through the operation of pin drum 47, in which case the tape 43 will be drawn through the sensing unit 10 by the action of member 126 and the transverse rows of perforations in the tape 43 will be sensed successively and the impulses indicative thereof will be transmitted upon the rotation of sleeve 186.

If the keyboard perforator is operated at a speed considerably faster than the speed of operation of sleeve 186, the sensing unit 10 including the frame members 105 and 106 will be rotated to a position shown in Fig. 6 against a stop pin 210 when a loop of tape as shown in solid lines in Fig. 6 will form between the sensing unit and the plates 14 and 16 of the perforator. As the member 126 is operated in a rectilinear motion, the tape 43 will be advanced through the sensing unit step by step to present the transverse rows of perforations successively to the sensing finbers 125.

If there is a prolonged cessation in the operation of the perforator, the loop of tape shown in Fig. 6 will be consumed and the tape between the sensing unit and the exit channel of the perforator will become taut, as indicated by the dotted lines in Fig. 6. Under such conditions, the sensing unit will be advanced in clockwise direction about its pivots along the tape 43. During such movement, the successive rows of perforations will be sensed and the impulses indicative thereof will be transmitted through the rotation of cam sleeve 186.

If, during the aforementioned movement of the sensing unit 10 in clockwise direction there is no operation of the perforator, the movement of the sensing unit continues until it abuts the plates 14 and 16 of the perforator. When in such position, the last row of perforations in tape 43 will be sensed and the impulses identified therewith will be transmitted. Pin 174 will, in such position, engage the upper end of spring contact 175 to open contacts 175 and 176 to deenergize electromagnet 177. Electromagnet 177, upon being deenergized, restores the stop latch 194 in the path of stop lug 193 which, upon being engaged, forces driven portion 191 against the tension of spring 197 to the right, as viewed in Fig. 4, whereupon a disengagement between the driving and driven portions 191 and 198 of the clutch 192 occurs and sleeve 186 is thus stopped.

Upon a resumption in the operation of the perforator, pin 174 moves free of contact 175 and contacts 175 and 176 are closed to complete the energizing circuit for electromagnet 177. Such condition prevails until the sensing unit is moved to a position where its tape entrance channel abuts the exit channel of the perforator 9.

While the invention has been disclosed and described with reference to a particular type of apparatus, it is obvious that it may be applied to other forms of apparatus without departing from the spirit and scope of the present invention.

What is claimed is:

1. A telegraph transmitter comprising a plurality of elements for sensing the control indicia on a strip, means controlled by said elements in accordance with control exercised by said indicia, means juxtapositioned with respect to said sensing elements and operatively associated therewith for transmitting signals as determined by said means, and means for advancing said strip to present the indicia to said elements including a member engaging said strip, and means for operating said member rectilinearly.

2. A telegraph transmitter comprising a plurality of elements for sensing the control indicia on a strip, means controlled by said elements in accordance with control exercised by said indicia, means juxtapositioned with respect to said sensing elements and operatively associated therewith for transmitting signals as determined by said means, means for advancing said strip to present the indicia to said elements including a member engaging said strip, and means operated mechanically by said signal transmitting means for operating said member rectilinearly.

3. A telegraph transmitter comprising a plurality of elements for sensing the control indicia on a strip, means controlled by said elements in accordance with control exercised by said indicia, means for transmitting signals as determined by the operation of said means, and means for advancing said strip to present the indicia to said elements including a member engaging said strip, and means operated cyclically and during the transmission of signals by said transmitting means for operating said member through a part of its rectilinear movement.

4. A telegraph transmitter comprising a plurality of elements for sensing the control indicia on a strip, means controlled by said elements in accordance with control exercised by said indicia, a cyclically operated transmitting means cooperating with said means for transmitting signals as determined by the operation of said elements, means rotated in timed relation with respect to said cyclically operated transmitting means, means for advancing said strip to present the indicia to said elements including a member engaging said strip, and means rotated by the means operated in timed relation with said cyclically operated means for operating said member rectilinearly.

5. A telegraph transmitter comprising a plurality of elements for sensing the control indicia on a strip, means controlled by said elements in accordance with control exercised by said indicia, means for transmitting signals as determined by said means, and means for advancing said strip to present the indicia to said elements including a member engaging said strip, rotary means for positively operating said member rectilinearly, and means to engage said strip and hold it temporarily against displacement during a portion of the rectilinear operation of said member.

6. A telegraph transmitter comprising a plurality of elements for sensing code perforations in a tape, there being a position in the tape individual to each element of the code to be transmitted, means controlled by said elements in accordance with control exercised by said indicia, means for transmitting signals as determined by said means, means for advancing said tape to present the transverse rows of perforations to said elements including a member carrying pins to engage said tape, means rotated cyclically with the operation of said transmitting means for operating said member rectilinearly, and means operative during a portion of the rectilinear movement of said member for engaging said tape and maintaining the relationship between said sensing elements and said tape.

7. A telegraph transmitter comprising a plurality of perforation sensing elements one for each unit of the code combination for which signals are to be transmitted from a perforated tape, means set by said elements in accordance with the perforations appearing in said tape, a plurality of electrical contacts, means controlled by said last mentioned means for determining the operation of said contacts, a transmitting cam shaft operative to allow the sequential operation of said contacts as determined by their control means, and means for advancing said tape to present the perforations to said elements including a member carrying pins normally engaging feed perforations in said tape, and means for operating said member rectilinearly to effect the disengagement of said pins from certain of said perforations in said tape and cause their engagement with other feed perforations therein to cause the advancement of said tape.

8. A telegraph transmitter comprising a plurality of elements for sensing the perforations in a previously perforated tape, there being a sensing element for each unit of the code combination of impulses to be transmitted, means controlled by said elements as determined by the perforations in said tape, a plurality of contacts, a cam type rotary distributor operative to condition said electrical contacts for operation as determined by the operation of the means controlled by said sensing elements, and means for advancing said tape to present the perforations to said elements including a member carrying pins arranged to disengage feed perforations in said strip and engage other feed perforations therein, and means on said rotary transmitting means for operating said member rectilinearly whereby said tape is advanced cyclically with respect to the operation of said transmitting means.

9. A telegraph transmitter comprising a plurality of elements for sensing perforations in a previously perforated tape, means controlled by said elements in accordance with their position as determined by the perforations in said tape, means for transmitting signals as determined by said means, and means for advancing said strip to present the perforations to said elements including a member carrying pins arranged to engage feed perforations in said strip, means for withdrawing said pins from engagement with said feed perforations and causing said pins to engage other feed perforations therein, and means operated by said signal transmitting means for causing the movement of said member whereby said tape is advanced past said sensing elements.

10. A telegraph transmitter comprising a plurality of elements for sensing perforations in a previously perforated tape, means controlled by said elements in accordance with their position as determined by the perforations in said tape, means for transmitting signals as determined by said means, and means for advancing said strip to present the transverse row of perforations to said elements including a member carrying on its upper edge pins for engaging feed perforations in said strip, means operated in timed relation to said transmitting means for causing said pins to disengage feed perforations in said tape and cause said pins to engage other feed perforations in said tape, means for entering the feed perforations in said tape previously engaged by the pins on said member to maintain the tape temporarily against displacement, and means for moving said member following the engagement of its pins with other feed perforations in said tape and the disengagement of said other means from said tape to cause the tape to be advanced past said sensing elements.

11. A telegraph transmitter comprising a plurality of elements for sensing perforations in a previously perforated tape, means controlled by said elements in accordance with their position as determined by the perforations in said tape, means for transmitting signal impulses in succession as determined by said means, and means for advancing said strip to present the perforations to said elements including a member arranged with pins to disengage certain feed perforations and engage other feed perforations in said strip, means operated positively by said signal impulse transmitting means for causing such disengagement and engagement, and other means for operating said member following the engagement of said pins with the said perforations in said tape to effect the advancement of said tape.

12. A telegraph transmitter comprising a plurality of elements for sensing perforations in a previously perforated tape, means controlled by said elements in accordance with their position as determined by the perforations in said tape, means for transmitting signals as determined by said means, means for advancing said tape to present the perforations to said elements including a member arranged with pins to disengage certain feed perforations in said tape and engage other feed perforations in said tape, means for positively causing such disengagement and engagement, other means for operating said member following the engagement of said pins with the said perforations in said tape to effect the advancement of said tape, and means normally in engagement with feed perforations in said tape for maintaining said tape temporarily against movement and operated by said member free of said tape and the perforations whereby upon the operation of said member said tape may be advanced.

13. A telegraph transmitter comprising a plurality of elements for sensing perforations in a previously perforated tape, means controlled by said elements in accordance with their position as determined by the perforations in said tape, means for transmitting signals as determined by said means, and means for advancing said tape to present the perforations to said elements including a member carrying two pins of the same length and a third pin of a greater length each pin engaging a feed perforation in said tape, means for moving said member to cause said pins to disengage and engage feed perforations in said tape, and means controlled by the pin of greater length for maintaining said tape temporarily against displacement.

14. A telegraph transmitter comprising a frame, a plurality of elements slidably mounted in said frame for sensing the transverse rows of perforations in a previously perforated tape, means controlled by said elements in accordance with the perforations in said tape as sensed by said elements, means for transmitting signals as determined by said means, a tape gate hingedly mounted to said frame, a member carrying pins arranged to engage the feed perforations in said tape, means for operating said member rectilinearly to cause the step-by-step advancement of said tape, and means carried by said gate and effective upon the withdrawal of said member to maintain temporarily the position of said tape with respect to said sensing elements.

15. A telegraph transmitter comprising a frame, a plurality of elements slidably mounted in said frame for sensing the transverse rows of perforations in a previously perforated tape, means controlled by said elements in accordance with the perforations in said tape as sensed by said elements, means for transmitting signals as determined by said means, a tape gate hingedly mounted to said frame, a member carrying pins arranged to engage the feed perforations in said tape, means for operating said member rectilinearly to cause the step-by-step advancement of said tape, and means on said gate carrying a plurality of pins arranged to enter feed perforations in said tape for maintaining temporarily said tape fixed with respect to said sensing elements.

16. A telegraph transmitter comprising a plurality of elements for sensing the perforations of a previously perforated tape, a plurality of bell crank levers one individual to each of said sensing elements, other bell crank levers controlled by said bell crank levers, electrical contacts controlled by the latter bell crank levers, a transmitting cam shaft for permitting the sequential operation of said latter bell crank levers in accordance with the control exercised by the former bell crank levers to effect the transmission of signals indicative of the perforations in said tape, a member normally in engagement with feed perforations in said tape, means for disengaging said member from said tape and causing its reengagement therewith, and means operative after the reengagement of said member with said tape for causing the movement of said member whereby said tape is advanced relatively to said sensing elements.

17. In combination with apparatus for applying an unlimited number of permanent indicia on a record strip, apparatus in juxtaposition with said indicia applying apparatus for sensing the indicia including a plurality of sensing elements cooperating with the indicia, means responsive to said elements, a plurality of electrical contacts, means for operating said contacts sequentially as determined by the operation of said means through said sensing elements, and means to advance the strip to bring successive indicia in alignment with said sensing elements and for advancing said sensing elements along said strip to a point immediately adjacent the point of application of said indicia when a predetermined condition prevails in said strip including a member engaging said strip, and means for operating said member rectilinearly whereby a relative movement between said strip and said sensing elements is effected.

18. In combination with apparatus for applying an unlimited number of permanent indicia on a record strip, apparatus in juxtaposition with said indicia applying apparatus for sensing the indicia including a plurality of sensing elements cooperating with the indicia, means responsive to said elements, a plurality of electrical contacts, means for operating said contacts sequentially as determined by the operation of said means through said sensing elements, and means to advance the strip to bring successive indicia in alignment with said sensing elements and for advancing said sensing elements along said strip to a point immediately adjacent the point of application of said indicia when a predetermined condition prevails in said strip, means for advancing said strip to present the indicia to said elements including a member normally in engagement with said strip, and means operated cyclically with said transmitting means for causing the operation of said member whereby it is actuated to effect a relative movement between said strip and said sensing fingers.

19. In combination with a strip perforator including code punches and a feed hole punch, means for controlling the effectiveness of said punches, means for operating said code punches in accordance with the operation of said means and said feed hole punch to perforate a strip with transverse rows of perforations and feed said strip, apparatus in juxtaposition with said strip perforator for sensing the code perforations in said strip including a plurality of sensing fingers, a plurality of electrical contacts through which impulses characteristic of the perforations are transmitted, means for operating said contacts sequentially in accordance with the position assumed by said sensing fingers as determined by the perforations in said strip, means cooperating with the feed holes in said strip, and means for causing said last mentioned means to be moved rectilinearly to effect a relative movement between said strip and said sensing fingers whereby under certain conditions said sensing fingers are moved along said strip whereas under other conditions said strip is advanced past said sensing fingers.

20. In combination with a perforator for applying code perforations and feed perforations in a strip, a unit in juxtaposition with said perforator including a movable frame, sensing fingers in said frame for sensing code perforations, feed mechanism in said frame cooperating with the feed perforations for advancing the strip, and power operated means for operating said feed mechanism rectilinearly to effect a relative movement between said frame and said strip.

21. In combination with a perforator for applying code perforations and feed perforations in a strip, a unit in juxtaposition with said perforator including a movable frame, sensing fingers in said frame for sensing code perforations in said strip, feed mechanism in said frame cooperating with the feed perforations for advancing the strip, a pivoted lever secured to each of said fingers and responsive to their position, a plurality of electrical contacts, a rotary distributor operative upon the movement of said frame to operate said contacts in accordance with the position of said levers, and means on said rotary distributor for moving said feed mechanism rectilinearly to cause relative movement of said strip and said frame.

22. In combination with a perforator for applying code perforations and feed perforations in a strip, a unit in juxtaposition with said perforator including a frame, sensing fingers in said frame for sensing code perforations in said strip, feed mechanism in said frame cooperating with the feed perforations in said strip, a pivoted lever secured to each of said fingers and responsive to their position, a plurality of electrical contacts, and a rotary distributor including means to operate said feed mechanism rectilinearly during a portion of the cycle of said distributor, and other means to actuate said contacts in accordance with the position of said levers.

23. In combination with a perforator for applying code perforations and feed perforations in a strip, a unit in juxtaposition with said perforator including a frame, sensing fingers in said frame for sensing code perforations in said strip, feed mechanism in said frame cooperating with the feed perforations in said strip, a pivoted lever secured to each of said fingers and responsive to their position, a plurality of electrical contacts, and a rotary distributor including means to operate said contacts in accordance with the position of said levers, and cams on said distributor for moving said feed mechanism rectilinearly.

24. Apparatus for imparting step-by-step advancement to a strip having rows of telegraph signal indicia comprising a member engageable with said strip, means for causing said member to be disengaged from and to engage said strip, means for presenting said member to a different area of said strip, means for holding said strip while said member is being presented to a different area of said strip for rendering said signal indicia effective, and rotary means for successively and positively operating said member for each successive row of telegraph signal indicia in the strip.

25. Apparatus for imparting step-by-step advancement to a strip having rows of telegraph signal indicia with a feed hole intermediate certain signal indicia comprising a member engageable with the feed holes in said strip, means for causing said member first to be moved free of said strip and then to engage said strip, rotary means for positively reciprocating said member longitudinally of said strip, and means for holding said strip while said member is free of said strip and is being moved to a different position.

26. A telegraph transmitter comprising a plurality of elements for sensing the control indicia on a strip, means controlled by said elements in accordance with the control exercised by said indicia, impulse transmitting means integrally arranged with said sensing elements and with said means for transmitting in sequence signal impulses determined by said first-mentioned means, means for advancing the strip to present indicia to said elements including a member engaging said strip, and means operated in timed relation with the operation of said transmitting means for operating said member rectilinearly.

27. A telegraph transmitter comprising a plurality of elements for sensing the control indicia on a strip, means controlled by said elements in accordance with the control exercised by said indicia, impulse transmitting means integrally arranged with said sensing elements and with said means for transmitting in sequence signal impulses determined by said first-mentioned means, means for advancing the strip to present indicia to said elements including a member engaging said strip, and means operated in timed relation with the operation of said transmitting means and for positively operating said member through a complete rectilinear path.

28. A telegraph transmitter comprising a plurality of elements for sensing the control indicia on a strip, means controlled by said elements in accordance with the control exercised by said indicia, impulse transmitting means integrally arranged with said sensing elements and with said means for transmitting in sequence signal impulses determined by said first-mentioned means, means for advancing the strip to present indicia to said elements including a member engaging said strip, means operated in timed relation with the operation of said transmitting means for causing said member to engage said strip while impulses are being transmitted preparatory to its subsequent movement, and rotary means for moving said member following its engagement with said tape to present a different control indicia to said sensing elements.

29. A telegraph transmitter comprising a plurality of elements for sensing the control indicia on a strip, means controlled by said elements in accordance with the control exercised by said indicia, impulse transmitting means integrally arranged with said sensing elements and with said means for transmitting in sequence signal impulses determined by said first-mentioned means, means for advancing the strip to present indicia to said elements including a member engaging said strip, means operated in timed relation with the operation of said transmitting means for causing said member to engage said strip while impulses are being transmitted preparatory to its subsequent movement, and rotary means for operating said member first to free said strip for movement and following which to move said strip to present a different control indicia to said sensing elements.

ROSS A. LAKE.